United States Patent [19]

Sehnal et al.

[11] Patent Number: 4,749,200

[45] Date of Patent: Jun. 7, 1988

[54] MECHANICAL SEAL WITH WELDED BELLOWS

[75] Inventors: Joseph Sehnal, Hoffman Estates; Leonard B. Mednick, Skokie, both of Ill.

[73] Assignee: John Crane-Houdaille, Inc., Morton Grove, Ill.

[21] Appl. No.: 864,768

[22] Filed: May 19, 1986

[51] Int. Cl.$^4$ .................... F16J 15/52; F16J 15/36
[52] U.S. Cl. ................................ 277/88; 277/200; 277/93 SD
[58] Field of Search ................ 277/42, 43, 88–90, 277/200, 93 SD, 212 FB, 93 R

[56] References Cited

U.S. PATENT DOCUMENTS

| | | | |
|---|---|---|---|
| 3,277,927 | 10/1966 | Schneider | 277/88 X |
| 3,977,685 | 8/1976 | Greenawalt | 277/89 |
| 4,365,816 | 12/1982 | Johnson et al. | 277/88 |
| 4,483,541 | 1/1980 | Wentworth | 277/88 |

FOREIGN PATENT DOCUMENTS

| | | | |
|---|---|---|---|
| 1409247 | 7/1965 | France | 277/88 |
| 388534 | 3/1933 | United Kingdom | 277/89 |

Primary Examiner—Robert S. Ward
Attorney, Agent, or Firm—Kinzer, Plyer, Dorn, McEachran & Jambor

[57] ABSTRACT

A rotary mechanical seal with metal bellows having reinforced weld joints. The bellows is formed of a plurality of adjacent annular discs or diaphragms having inner and outer circumferences welded together. A plurality of annular reinforcing rings are provided, each being associated with the welded joint at one circumference of the diaphragms. The associated rings and the circumferences define a weld area. The presence of the reinforcing rings allows for larger and stronger welds along the associated circumferences, which increases the capacity of the seal to withstand operating pressures.

10 Claims, 1 Drawing Sheet

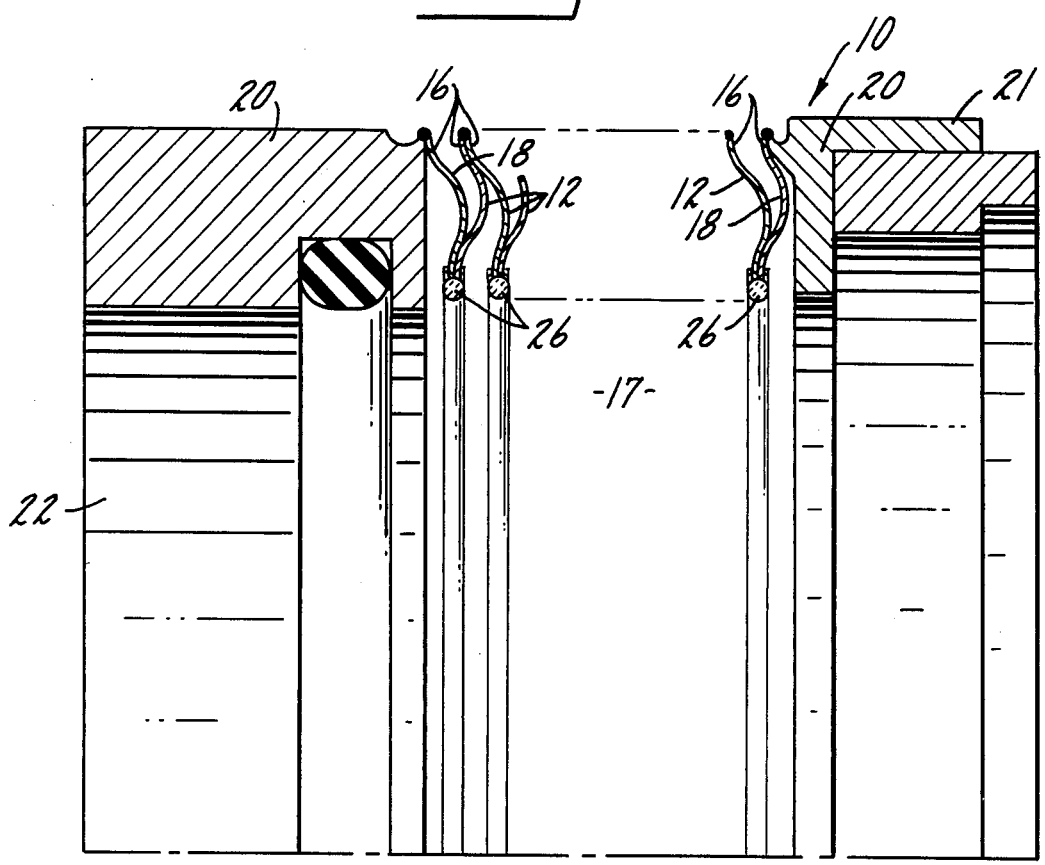
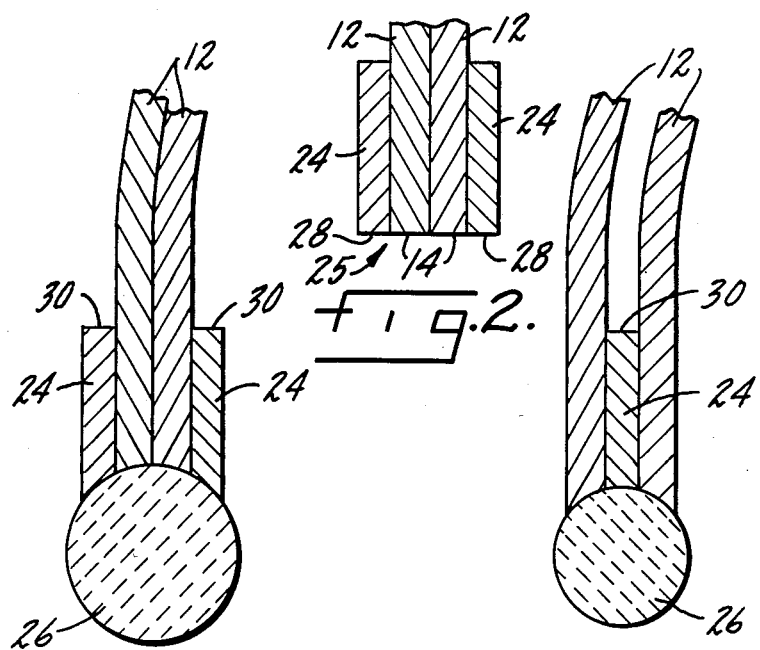

MECHANICAL SEAL WITH WELDED BELLOWS

BACKGROUND OF THE INVENTION

Rotary mechanical face seals with metal bellows are used in high temperature applications. They are also used in systems handling cryogenics, heat transfer fluids, corrosive and abrasive chemicals, refinery products, and in chemicals where many other types of seals would be destroyed. Such bellows are formed of a series of annular metal discs or diaphragms welded together to form an axially compressible bellows. The capacity of the bellows is limited by the strength of the weld joints.

U.S. Pat. No. 3,090,403 to Kroekel exemplifies one form of bellows in the prior art. This patent discloses the use of laminated annular diaphragms, welded together at their inner and outer circumferences. Stress is divided between the separate laminae, to reduce the stress borne by the individual diaphragms.

SUMMARY OF THE INVENTION

The present invention offers a novel approach to increased strength. The bellows of the present invention includes a plurality of adjacent annular diaphragms having inner and outer circumferences. A plurality of annular reinforcing rings are provided, each ring being associated with a circumference of a diaphragm. Associated rings and the adjacent circumferences of adjacent diaphragms define a weld area or joint. Annular welds join the associated rings and circumferences of adjacent diaphragms at the weld area. This arrangement permits deposit of an increased size of the weld bead and improves strength of the weld joint along the circumference, thereby providing an increase in the pressure the bellows seal will withstand during use. For an interior pressurized seal, that is, with the inside of the bellows exposed to the pressurized fluid, the annular rings and increased sized weld bead would be provided at the weld connection of the outer diameters of the discs or diaphragms. For a seal with the outer surface of the bellows exposed to operating pressure, the rings and increased size weld bead would be associated with the joinder of the inner diameters of the annular diaphragms.

BRIEF DESCRIPTION OF THE DRAWINGS

FIG. 1 is a quarter-section view of a rotary mechanical seal component embodying the metal bellows of the present invention.

FIG. 2 is a partial, enlarged view of a partially assembled seal bellows illustrative of the principles of the invention.

FIG. 3 is a partial, enlarged view of a weld joint at the juncture of the circumferences of adjacent diaphragms, disposed between two associated reinforcing rings.

FIG. 4 is a partial, enlarged view of a weld joint of an alternate embodiment of the invention, showing a reinforcing ring disposed between the circumferences of adjacent diaphragms.

DETAILED DESCRIPTION OF THE ILLUSTRATED EMBODIMENT

In the accompanying drawings there is illustrated a rotary mechanical seal with metal bellows which embodies the principles of the present invention. Generally, the metal bellows is formed by a plurality of adjacent annular discs or diaphragms, alternately welded at their inner and outer circumferences. Such seals are particularly useful in high temperature applications or other harsh environments. In accordance with the present invention, it has been found that the strength of the bellows can be improved by employing reinforcing rings along the weld joints between adjacent diaphragms.

As shown in FIG. 1, a metal bellows 10 typically comprises a plurality of adjacent annular discs or diaphragms 12. As illustrated, all of the diaphragms 12 have a similar convoluted shape. Each diaphragm 12 has an inner diameter or circumference 14 and an outer diameter circumference 16. The inner circumferences of the diaphragms define a cylindrical opening 17 through which a shaft many extend. The outer circumferences of the two end diaphragms 18 are welded to flanges 20 in a fluid-tight casing 21. The flanges 20 have a central bore 22, aligned with the cylindrical opening 17, through which the shaft may extend.

In this embodiment, the seal depicted is exposed to pressure at its exterior. That is the outer convoluted surface of the bellows is exposed to the fluid under pressure. The principles of the invention are, however, equally applicable to interior pressurized seals where the interior of the bellows is subjected to the fluid under pressure.

To form the bellows structure, each end diaphragm 18 is welded at its inner circumference 14 to the inner circumference of an adjacent diaphragm 12. Each diaphragm 12 between the end diaphragms 18 is welded at its inner circumference 14 to the inner circumference of one adjacent diaphragm 12 and at its outer circumference 16 to the outer circumference of another adjacent diaphragm. This structure permits the bellows to axially compress from its free standing length and re-expand upon removal of the compressive forces.

The present invention provides larger and stronger weld joints between diaphragms by providing a plurality of reinforcing rings 24. As shown in FIG. 1, in this embodiment the reinforcing rings are disposed at the inner diameter or circumferences 14 of the diaphragms 12. The outer diameters or circumferences 16 of the diaphragms 12 are welded together without reinforcing rings. In an interior pressurized seal the rings would be associated with the weld at the outer diameters of the diaphragms. In some cases it might be desired to utilize such rings at the weld of both the inner and outer diameters of the diaphragms 12.

As shown in FIG. 2, two reinforcing rings 24 are associated with the inner diameters or circumferences 14 of two adjacent diaphragms 12. Together, the associated discs and inner circumferences of the adjacent diaphragms define weld areas 25. As best seen in FIGS. 1 and 3, a plurality of annular weld beads 26 complete the weld joint and join the associated reinforcing rings and inner circumferences of adjacent diaphragms. With the rings 24, the weld bead may be larger and, hence, the resultant weld is stronger.

The reinforcing rings 24 are concentric with the diaphragms 12, and are preferably of the same thickness and material as the diaphragms. Generally the thickness can be from about 0.004 inch to 0.008 inch. The material is usually stainless steel. With the two reinforcing rings 24, the area 25 to be joined by the bead 26 may be approximately twice the axial length it would be without the rings. Hence, the size of the weld bead 26 is correspondingly increased. The areas of the weld bead can be four times as large as those between diaphragms without reinforcing rings.

Like the diaphragms 12, the reinforcing rings 24 have inner 28 and outer 30 diameters or circumferences. In the illustrated embodiment, the diameter of each ring's inner circumference 28 is substantially equal to the diameter of each diaphragm's inner circumference 14. However, the diameter of each ring's outer circumference 30 is substantially less than the diameter of each diaphragm's outer circumference. It is only necessary that the rings 24 have a radial extent sufficient to accommodate the application of the weld bead 24. If the rings 24 were applied to the weld joint at the outer diameters of the bellows discs 12, the outer diameter 30 of the rings would be approximately equal to the outer diameter 16 of the discs and the inner diameter 28 would be such that the radial extent of the discs would be sustantially less than the radial extent of the discs 12.

An example of a bellows 10 which has been successfully welded in accordance with this invention includes a plurality of discs 12 of ATM-350 steel, having a thickness of 0.005 inch. Each had an outside diameter or circumference 16 of 2.315 inches and an inside diameter or circumference 14 of 1.812 inches, thereby forming an annulus of 0.250 inch radial extent. Reinforcement rings 24 of 0.005 inch thickness were utilized. The rings had an inside diameter of 1.812 inches and an annulus of 0.0625 inch radial extent.

The weld bead to be applied to a normal two ply weld between adjacent diaphragms of 0.005 inch thickness is 0.012 inch. The weld applied to the four ply stack of two adjacent diaphragms 12 and two associated rings 24 was 0.024.

FIG. 4 illustrates an alternate embodiment of the invention, employing a single reinforcing ring 24 disposed between two adjacent diaphragms 12 at the inner circumferences 14. This embodiment could also be used at the outer circumference of the bellows. As in the previously described embodiment, the ring 24 is preferably of the same thickness and material as the diaphragm 12; the diameter of the ring's inner circumference is substantially equal to that of the diaphragm; and, the diameter of the ring's outer circumference is substantially less than that of the diaphragm. The presence of the reinforcing ring 24 increases the size of the weld area, and thereby allows for a larger, stronger weld bead 26 to be applied along the inner circumference.

The reinforcing rings 24 may be made simply. They may be punched from the same material used to form bellows. The reinforcing rings may then be placed along the circumference of a diaphragm prior to welding. This is applicable whether the outer diameter weld is to be reinforced, the inner diameter weld is to be reinforced, or both. The rings and diaphragms are then welded together, in a manner similar to the standard manner of manufacturing such bellows. The welding procedure should be less difficult to accomplish because of the larger weld area, that is, as shown in FIG. 2, a thicker stock of metal is represented and is easier to weld than thin metal represented by the bellows above.

With the larger weld beads of the present invention, the weld characteristics and strength of the bellows at the weld joints are improved. The bellows exhibits a higher burst pressure, and may be operated at higher pressures or temperatures while maintaining an adequate safety margin. While a bellows made in accordance with the present invention may exhibit a slight increase in its spring rate, this increase does not adversely affect the performance of the seal.

It should be appreciated that, depending upon the environment in which the seal is used, the reinforcing rings may be disposed along the outer circumferences of the diaphragms, or along both the inner and outer circumferences.

Additional modifications and/or additions may be included by those skilled in the art without departing from the scope of the invention as defined by the claims.

I claim:

1. A rotary mechanical seal with a metal bellows comprising:
   a plurality of adjacent annular diaphragms, each diaphragm having inner and outer circumference;
   a plurality of annular reinforcing rings, concentric with the diaphragms, each reinforcing ring being associated with a circumference of a diaphragm, each associated reinforcing ring and circumference defining a weld area; and
   a plurality of annular weld beads, each weld bead joining an associated reinforcing ring and inner circumference of a diaphragm at the weld area.

2. A seal as claimed in claim 1 wherein the circumferences of two adjacent diaphragms are disposed between two reinforcing rings.

3. A seal as claimed in claim 1 wherein one reinforcing ring is disposed between the circumferences of two adjacent diaphragms.

4. A seal as claimed in claim 1 wherein: each reinforcing ring has an inner and outer circumference, and wherein the diameter of the ring's inner circumference is substantially equal to the diameter of the diaphragm and the radial extent of each said ring is substantially smaller than the radial extent of the associated diaphragm.

5. A seal as claimed in claim 1 further comprising:
   a plurality of annular reinforcing rings, concentric with the diaphragms, each reinforcing ring being associated with an outer circumference of a diaphragm, each associated reinforcing ring and outer circumference defining a weld area; and
   a plurality of annular weld beads, each weld bead joining an associated reinforcing ring and outer circumference of a diaphragm at the weld area.

6. A metal bellows for a rotary mechanical seal comprising:
   a plurality of adjacent annular diaphragms, each diaphragm having inner and outer circumference;
   a plurality of annular reinforcing rings, concentric with the diaphragm, each reinforcing ring being associated with a circumference of a diaphragm, each associated reinforcing ring and circumference defining a weld area; and
   a plurality of annular weld beads, each weld bead joining an associated reinforcing ring and inner circumference of a diaphragm at the weld area.

7. A bellows as claimed in claim 6 wherein the circumferences of two adjacent diaphragms are disposed between two reinforcing rings.

8. A bellows as claimed in claim 6 wherein one reinforcing ring is disposed between the circumferences of two adjacent diaphragms.

9. A bellows as claimed in claim 6 wherein:
   each reinforcing ring has an inner and outer circumference, and wherein the diameter of the ring's inner circumference is substantially equal to the diameter of the diaphragm and the radial extent of each said ring is substantially smaller than the radial extent of the associated diaphragm.

10. A bellows as claimed in claim 6 further comprising:
a plurality of annular reinforcing rings, concentric with the diaphragms, each reinforcing ring being associated with an outer circumference of a diaphragm, each associated reinforcing ring and outer circumference defining a weld area; and
a plurality of annular weld beads, each weld bead joining an associated reinforcing ring and outer circumference of a diaphragm at the weld area.

* * * * *